(12) United States Patent
Giovinazzo

(10) Patent No.: US 7,242,287 B1
(45) Date of Patent: Jul. 10, 2007

(54) VEHICLE WARNING SYSTEM AND METHOD

(76) Inventor: Joseph Giovinazzo, 6-51 158th St., Whitestone, NY (US) 11357

( * ) Notice: Subject to any disclaimer, the term of this patent is extended or adjusted under 35 U.S.C. 154(b) by 218 days.

(21) Appl. No.: 10/968,657

(22) Filed: Oct. 19, 2004

(51) Int. Cl.
*B60Q 1/44* (2006.01)
(52) U.S. Cl. .................. 340/479; 340/465; 340/436; 307/10.1; 200/61.89
(58) Field of Classification Search ........... 340/479, 340/468, 467, 425.5, 436, 465, 469, 438, 340/453, 472, 463; 200/61.89; 307/10.1, 307/10.8
See application file for complete search history.

(56) References Cited

U.S. PATENT DOCUMENTS

| | | | |
|---|---|---|---|
| 3,786,507 A | | 1/1974 | Hurd, Jr. |
| 4,556,862 A | | 12/1985 | Meinershagen |
| 4,600,913 A | * | 7/1986 | Caine ................. 340/435 |
| 4,694,296 A | | 9/1987 | Sasaki et al. |
| 4,983,953 A | | 1/1991 | Page |
| 5,089,805 A | | 2/1992 | Salsman |
| 5,091,726 A | * | 2/1992 | Shyu .................. 701/96 |
| 5,150,098 A | | 9/1992 | Rakow |
| 5,162,794 A | | 11/1992 | Seith |
| 5,345,218 A | * | 9/1994 | Woods et al. ........... 340/479 |
| 5,434,554 A | * | 7/1995 | Caesar ................ 340/468 |
| 5,467,072 A | | 11/1995 | Michael |
| 5,594,416 A | | 1/1997 | Gerhaher |
| 5,663,706 A | * | 9/1997 | Francis ............... 340/464 |
| 5,838,228 A | * | 11/1998 | Clark ................. 340/436 |
| 5,838,259 A | * | 11/1998 | Tonkin ............... 340/903 |
| 5,856,793 A | | 1/1999 | Tonkin et al. |
| 6,072,391 A | * | 6/2000 | Suzuki et al. ........... 340/468 |
| 6,100,799 A | | 8/2000 | Fenk |
| 6,150,933 A | | 11/2000 | Matsumoto |
| 6,160,476 A | | 12/2000 | Ponziani |
| 6,177,866 B1 | | 1/2001 | O'Connell |
| 6,225,918 B1 | * | 5/2001 | Kam ................. 340/903 |
| 6,243,008 B1 | | 6/2001 | Korabiak |
| 6,333,688 B1 | | 12/2001 | Brown et al. |
| 6,710,709 B1 | | 3/2004 | Morin et al. |
| 6,744,361 B1 | * | 6/2004 | Maddox .............. 340/479 |
| 2001/0054957 A1 | | 12/2001 | Cohen et al. |
| 2004/0012488 A1 | * | 1/2004 | Schofield ............. 340/435 |

FOREIGN PATENT DOCUMENTS

| | | | |
|---|---|---|---|
| JP | 02002059795 A | * | 2/2002 |
| WO | WO91/17068 | | 11/1991 |

* cited by examiner

*Primary Examiner*—Benjamin C. Lee
*Assistant Examiner*—Daniel Previl
(74) *Attorney, Agent, or Firm*—Collard & Roe, P.C.

(57) ABSTRACT

A vehicle warning system and a method of modifying a vehicle is provided. The system is installable on a vehicle having a brake pedal operatively connected to a brake light mounted on a rear portion of the vehicle. In one aspect, the vehicle warning system includes a distance proximity sensor adapted for mounting on the rear portion of the vehicle and a controller operatively connected to the sensor. The controller is adapted to receive a brake signal when the brake pedal of the vehicle is depressed, which activates the controller to send a start flashing signal to the brake light. The sensor sends a stop flashing signal to the controller upon sensing a vehicle within a selected distance behind the vehicle.

8 Claims, 2 Drawing Sheets

VEHICLE WARNING SYSTEM AND METHOD

BACKGROUND OF THE INVENTION

1. Field of the Invention

The present invention relates to a warning system for a vehicle. More particularly, the invention relates to a vehicle warning system and method that provides flashing indications to a following vehicle of a braking condition.

2. The Prior Art

It is known in the art to provide a warning light to signal stopping or turning of a vehicle. For example, U.S. Pat. No. 6,710,709 to Morin et al. discloses a flashing or blinking center brake light that uses an intermittent relay to flash the brake light when the brakes are applied. However, this system causes the brake light to flash at all times when the brakes are applied which causes annoyance to the drivers following in heavy traffic and unnecessary drainage on the battery in such situations.

It is also known to mount a distance detector to the rear of a vehicle coupled to a warning light. U.S. Pat. No. 5,838,228 to Clark shows a system for preventing rear end collisions which includes control circuitry which intermittently activates a bulb in a warning light display mounted with mounting arms to the rear of a vehicle and coupled to a distance detector. The control circuitry intermittently activates the bulb when the distance detector detects a distance from a following car lower than a predetermined value in relation to the speed of the leading car. This system, however, is complicated and requires the addition of an unsightly add-on display to a motor vehicle.

Other forms of warning systems are shown in U.S. Pat. No. 6,744,361 to Maddox; U.S. Pat. No. 6,243,008 to Korabiak; U.S. Pat. No. 6,225,918 to Kam; U.S. Pat. No. 6,177,866 to O'Connell; U.S. Pat. No. 6,160,476 to Ponziani; U.S. Pat. No. 5,838,259 to Tonkin; U.S. Pat. No. 5,467,072 to Michael; U.S. Pat. No. 5,345,218 to Woods et al.; U.S. Pat. No. 5,162,794 to Seith; U.S. Pat. No. 4,694,296 to Sasaki et al.; U.S. Pat. No. 4,600,913 to Caine; and U.S. Pat. No. 3,786,507 to Hurd, Jr.

For example, U.S. Pat. No. 5,838,259 to Tonkin discloses a brake light warning system which in one embodiment activates an array of lights upon depression of the brake pedal. The array of lights may be operated in a cyclical pattern when the vehicle is stationary or near stationary and is deactivated when a proximity sensor detects that a following vehicle is less than a certain distance behind the vehicle carrying the display system.

Although a number of vehicle warning systems are known, there is still a need for a vehicle warning system and method that is easily and inexpensively installable into an existing vehicle brake warning system and that does not cause unnecessary annoyance to other drivers or undue drainage of vehicle battery power.

SUMMARY OF THE INVENTION

A vehicle warning system and a method of modifying a vehicle to provide a flashing warning are provided. In one aspect, the vehicle warning system includes a distance proximity sensor and a controller operatively connected to the sensor. The distance proximity sensor is adapted for mounting on the rear portion of a vehicle having a brake pedal operatively connected to a brake light mounted on the rear portion of the vehicle. The controller is adapted to receive a brake signal when the brake pedal of the vehicle is depressed. The brake pedal activates the controller to send a start flashing signal to the brake light. The sensor sends a stop flashing signal to the controller upon sensing a vehicle within a selected distance, preferably forty feet or less, behind the vehicle.

In another aspect, a method is provided which modifies a vehicle having a brake pedal operatively connected to a brake light mounted on a rear portion of the vehicle to provide a flashing warning. In accordance with the method, a distance proximity sensor is mounted on the rear portion of the vehicle. A controller is operatively connected to receive a brake pedal signal when the brake pedal of the vehicle is depressed and to send a start flashing signal to the brake light. The sensor is operatively connected to the controller to deactivate the controller upon sensing a vehicle within a selected distance behind the vehicle.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings.

DETAILED DESCRIPTION OF PREFERRED EMBODIMENTS

Figure 1:
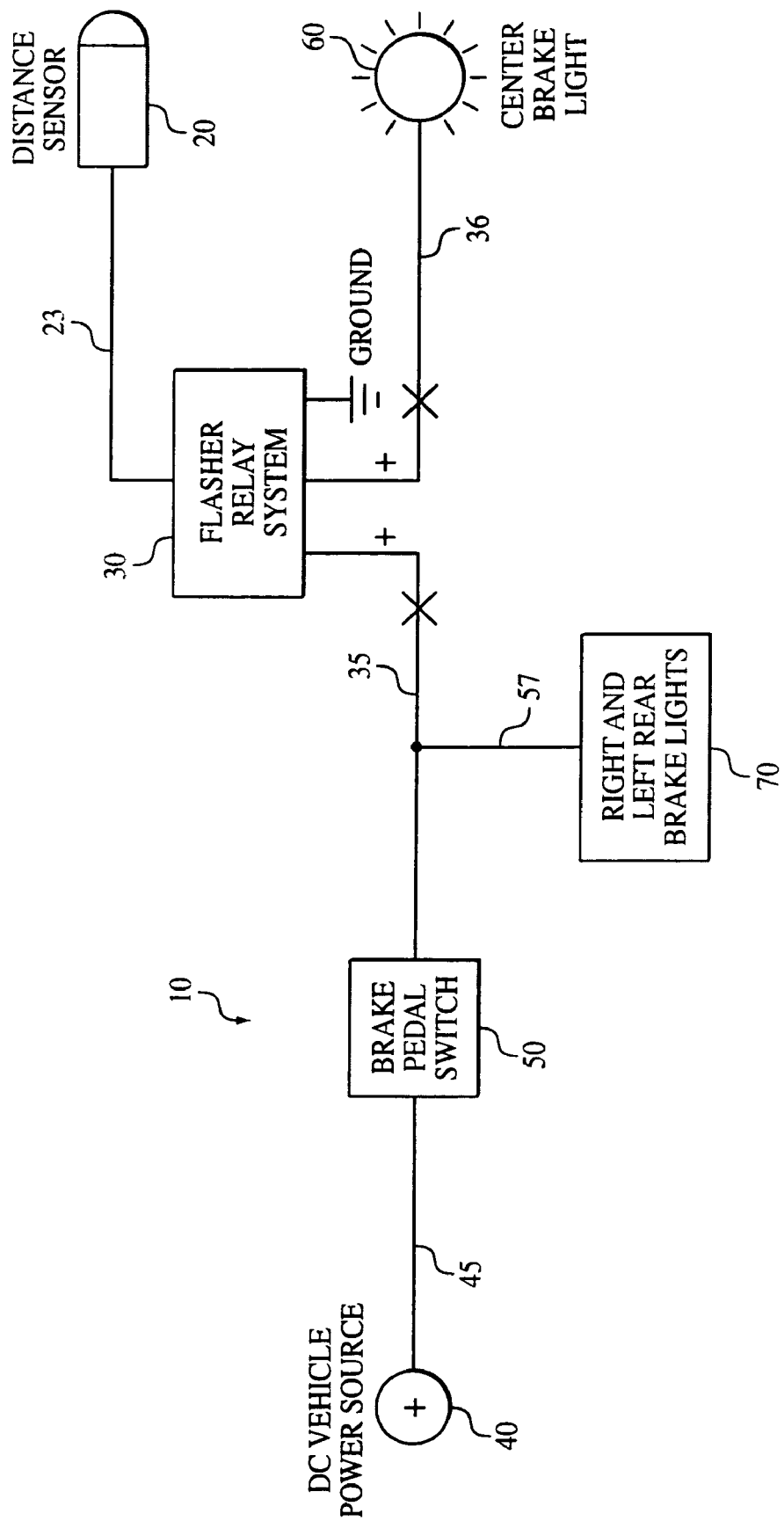
FIG. 1 is a schematic block diagram of an embodiment of a vehicle warning system of the present invention.
Figure 2:
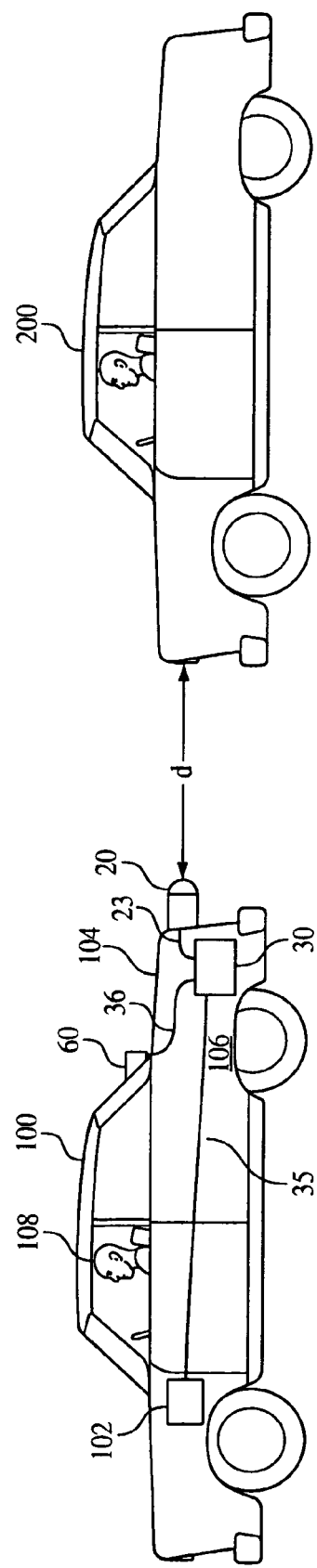
FIG. 2 is a side view schematically showing the forward vehicle using the embodiment of FIG. 1 to detect a following vehicle.

Turning now in detail to the drawings, FIGS. 1-2 show a vehicle warning system of a preferred embodiment for a vehicle 100 such as an automobile, truck or motorcycle having a brake actuator such as brake pedal 102 operatively connected to brake light 60 mounted on a rear portion 104 of vehicle 100.

System 10 includes a distance proximity sensor 20 and a controller 30 operatively connected to sensor 20 through line 23. Controller 30 may take the form of a flasher relay system or timer/relay circuit having a trigger input in which an electrical signal from the brake pedal acts as a trigger to activate the timer/relay circuit. A sensor 20 is adapted for mounting on the rear portion 104 of vehicle 100.

Preferably, the timer/relay circuit is contained in a small housing or box that takes up little space in the interior of the vehicle. For example, the housing for the timer/relay can be three inches tall, two inches wide and one inch thick or deep. Other dimensions for the housing can also be used.

Controller 30 is adapted to receive a brake signal when brake pedal 102 of vehicle 100 is depressed, with the brake signal activating controller 30 to send a start flashing signal to the brake light, such as center brake light 60. For example, as shown in FIG. 1, controller 30 is powered directly by the vehicle's battery or other power source 40 within the vehicle. A positive power line 45 supplies a brake pedal switch 50 which is electrically connected to a brake light such as center brake light 60 and right and left rear brake lights 70. When the driver presses down on brake pedal 102, switch 50 closes and supplies power to lines 35 and 57. Controller 30 is interposed in line 35 (brake light positive (+) wire) between brake pedal switch 50 and center brake light 60. Controller 30 preferably includes a flashing relay which is activated when the brakes are applied and power is supplied via center brake light positive wire 35. Upon activation, the flashing relay applies and removes power to center brake light 60 at 0.5 second intervals.

Proximity sensor 20 is designed to activate and send a stop flashing signal to controller 30 upon sensing a vehicle 200 within a selected distance d, for example zero to thirty or forty feet, behind sensor 20. Typically, sensor 20 will activate, depending on the shape and size of object 200 such as a car or truck in front of sensor 20 behind vehicle 100 on which sensor 20 is mounted. For example, a commercially-available proximity sensor with a forty foot nominal range may activate in practice at thirty to thirty-five feet for a large vehicle such as a truck and at thirty feet or less for a car or smaller object. Thus, center brake light 60 will flash only when a following car is sufficiently far away for the flashing to serve as an effective warning. So long as brake pedal 102 is depressed, center brake light 60 will continue to flash until proximity sensor 20 sees an object within its range, for example when a following car comes within approximately thirty feet. At this time, proximity sensor 20 will send a signal to controller 30, for example a trigger voltage to a timer which in turn will stop the relay from flashing center brake light 60. At this point normal operation of center brake light 60 resumes, i.e. continuous illumination when brake pedal 102 is depressed and deillumination when brake pedal 102 is released. This feature prevents the system from causing undue annoyance when following car 200 is close to vehicle 100, such as in stop-and-go driving.

Preferably, proximity sensor 20 is waterproof and mounted on the outside rear of vehicle 100. Controller 30 is powered only when the brakes are applied, which will start the flashing of center brake light 60 at approximately two times a second. When proximity sensor 20 senses another vehicle 200 directly behind the vehicle on which it is mounted, it will send a signal to controller 30 to stop flashing center brake light 60.

Because the system is powered only when the brakes are applied, there is no drain on battery 40 when the car is off. If controller 30 becomes defective or fails and does not power up, power would still proceed through line 36 to center brake light 60 upon activation of brake pedal switch 50 because the flasher system will be out of the brake light circuit by default. Thus, center brake light 60 will continue to operate normally, i.e. continuously on when brake pedal 102 is depressed and off when brake pedal 102 is released.

The system is easily installed on any vehicle with a center brake light. There is no need to modify the center brake light or any of the bulbs therein to accomplish flashing. Controller 30 is simply installed in the line between brake pedal switch 50 and center brake light 60. Preferably, controller 30 is installed in the interior of the vehicle, for example, the trunk or passenger compartment of the car.

In another aspect, a method is provided in which a vehicle having a brake pedal operatively connected to a brake light mounted on a rear portion of the vehicle is modified to provide a flashing warning.

In accordance with the method, a distance proximity sensor 20 is mounted on rear portion 104 of vehicle 100 as shown in FIG. 2. A controller 30 is operatively connected to receive a brake signal when brake pedal 102 of vehicle 100 is depressed and to send a start flashing signal to brake light 60. Sensor 20 is operatively connected to controller 30 to deactivate controller 30 upon sensing a vehicle 200 within a selected distance behind the vehicle 100 on which sensor 20 is mounted. Deactivation of controller 30 causes electrical current to pass through lines 35 and 36 to power center brake light 60 continuously when brake pedal switch 50 is closed upon depression of the brake pedal by the driver.

Controller 30 preferably includes a timer/relay circuit with a trigger input and is installed in an interior portion 106 of vehicle 100. Sensor 20 is preferably waterproof and deactivates controller 30 upon sensing a vehicle 200 within a selected range, for example zero to thirty or forty feet behind the vehicle 100 in which it is mounted. Controller 30 may be operatively connected to center brake light 60 of vehicle 100 and the start flashing signal causes center brake light 60 to flash approximately two times a second. Controller 30 preferably receives power only when the brake pedal 102 is depressed by the driver 108.

Although only at least one embodiment of the present invention have been shown and described, it is to be understood that many changes and modifications may be made thereunto without departing from the spirit and scope of the invention as described in the appended claims.

What is claimed is:

1. A vehicle warning system for a vehicle having a brake pedal operatively connected to a brake light mounted on a rear portion of the vehicle, said vehicle warning system comprising:
   (a) a distance proximity sensor mounted on the rear portion of a vehicle; and
   (b) a controller operatively connected to said sensor and receiving a brake signal when the brake pedal of the vehicle is depressed, said brake pedal activating said controller to send a start flashing signal to the brake light;
   wherein said sensor sends a stop flashing signal to the controller upon sensing a vehicle within a selected distance behind the vehicle; and
   wherein said sensor is waterproof, the selected distance is forty feet or less, and the controller sends a start flashing signal to the brake light only when a vehicle is at a distance greater than the selected distance.

2. The vehicle warning system according to claim 1 wherein said controller comprises a timer/relay circuit having a trigger input.

3. The vehicle warning system according to claim 1 wherein the controller is operatively connected to a center brake light of the vehicle and the start flashing signal causes the center brake light to flash approximately two times a second.

4. The vehicle warning system according to claim 1 wherein the controller receives power only when the brake pedal is depressed.

5. A method of modifying a vehicle having a brake pedal operatively connected to a brake light mounted on a rear portion of the vehicle to provide a flashing warning comprising the steps of:
   (a) mounting a distance proximity sensor on the rear portion of the vehicle;
   (b) operatively connecting a controller to receive a brake signal when the brake pedal of the vehicle is depressed and to send a start flashing signal to the brake light; and
   (c) operatively connecting the sensor to the controller to deactivate the controller upon sensing a vehicle within a selected distance behind the vehicle;
   wherein the sensor is waterproof, the selected distance is forty feet or less, and the sensor deactivates the controller upon sensing a vehicle within the selected distance so that the controller sends a start flashing signal to the brake light only when a vehicle is at a distance greater than the selected distance.

6. The method according to claim 5 wherein the controller comprises a timer/relay circuit having a trigger input and is installed in an interior portion of the vehicle.

7. The method according to claim 5 wherein the controller is operatively connected to a center brake light of the vehicle and the start flashing signal causes the center brake light to flash approximately two times a second.

8. The method according to claim 5 wherein the controller receives power only when the brake pedal is depressed.

* * * * *